(12) United States Patent
Kang et al.

(10) Patent No.: US 11,922,048 B2
(45) Date of Patent: Mar. 5, 2024

(54) MEMORY CONTROLLER MANAGING MAP DATA AND OPERATING METHOD THEREOF

(71) Applicant: SK hynix Inc., Gyeonggi-do (KR)

(72) Inventors: Hye Mi Kang, Gyeonggi-do (KR); Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 67 days.

(21) Appl. No.: 17/148,116

(22) Filed: Jan. 13, 2021

(65) Prior Publication Data

US 2022/0004332 A1 Jan. 6, 2022

(30) Foreign Application Priority Data

Jul. 6, 2020 (KR) ........................ 10-2020-0083041

(51) Int. Cl.
*G06F 12/00* (2006.01)
*G06F 3/06* (2006.01)
*G06F 12/1009* (2016.01)
*G06F 12/1027* (2016.01)
*G06F 12/12* (2016.01)

(52) U.S. Cl.
CPC .......... *G06F 3/0655* (2013.01); *G06F 3/0604* (2013.01); *G06F 3/0679* (2013.01); *G06F 12/1009* (2013.01); *G06F 12/1027* (2013.01); *G06F 12/12* (2013.01)

(58) Field of Classification Search
CPC .. G06F 12/1009; G06F 12/1027; G06F 12/12; G06F 3/0655
See application file for complete search history.

(56) References Cited

U.S. PATENT DOCUMENTS

| 2017/0147260 A1* | 5/2017 | Byun ................ G06F 3/0659 |
| 2017/0371548 A1* | 12/2017 | Um ................ G06F 12/0246 |
| 2018/0314643 A1* | 11/2018 | Park ................ G06F 12/0246 |

FOREIGN PATENT DOCUMENTS

| KR | 10-2018-0029124 | 3/2018 |
| KR | 10-2021-0012820 | 2/2021 |

* cited by examiner

*Primary Examiner* — Reginald G Bragdon
*Assistant Examiner* — Michael L Westbrook
(74) *Attorney, Agent, or Firm* — IP & T GROUP LLP

(57) ABSTRACT

A memory controller for controlling a memory device which stores logical-to-physical (L2P) segments includes a map data storage and a map manager. The map data storage stores a plurality of physical-to-logical (P2L) segments including mapping information between a physical address of the memory device in which write data is to be stored and a logical address received from a host, in response to a write request received from the host. The map manager updates the L2P segments stored in the memory device, based on target P2L segments corresponding to a write command provided to the memory device, which have a higher priority than the other P2L segments among the plurality of P2L segments. Each of L2P segments includes mapping information between a logical address and a physical address of data stored in the memory device.

18 Claims, 11 Drawing Sheets

FIG. 3

| Write Operation | | PHYSICAL ADDRESS | | LOGICAL ADDRESS | |
|---|---|---|---|---|---|
| | | Index | BLK# | Offset | |
| BLK1 | | | | | |
| PPN1 | LBA1 | PPN1 | 1 | 1 | LBA1 |
| PPN2 | LBA2 | PPN2 | 1 | 2 | LBA2 } P2L Seg1 |
| PPN3 | LBA3 | PPN3 | 1 | 3 | LBA3 |
| PPN4 | LBA4 | PPN4 | 1 | 4 | LBA4 |
| BLK2 | | | | | |
| PPN5 | LBA9 | PPN5 | 2 | 1 | LBA9 } P2L Seg2 |
| PPN6 | LBA10 | PPN6 | 2 | 2 | LBA10 |
| PPN7 | LBA11 | PPN7 | 2 | 3 | LBA11 |
| PPN8 | LBA12 | PPN8 | 2 | 4 | LBA12 |
| BLK3 | | | | | } P2L Seg3 |
| PPN9 | LBA5 | PPN9 | 3 | 1 | LBA5 |
| PPN10 | LBA6 | PPN10 | 3 | 2 | LBA6 |
| PPN11 | LBA7 | PPN11 | 3 | 3 | LBA7 } P2L Seg4 |
| PPN12 | LBA8 | PPN12 | 3 | 4 | LBA8 |

221

Store P2L Segment in an input order

| Entry | P2L Segment | Flag |
|---|---|---|
| 1 | P2L Seg 1 | D |
| 2 | P2L Seg 2 | D |
| 3 | P2L Seg 3 | D |
| 4 | | |
| 5 | | |
| 6 | | |

Set Flag D according to Write REQ

221

| Entry | P2L Segment | Flag |
|---|---|---|
| 1 | P2L Seg 1 | U |
| 2 | P2L Seg 2 | U |
| 3 | P2L Seg 3 | D |
| 4 | | |
| 5 | | |
| 6 | | |

Set Flag U according to Unmap REQ

221

| Entry | P2L Segment | Flag |
|---|---|---|
| 1 | P2L Seg 1 | U |
| 2 | P2L Seg 2 | U |
| 3 | P2L Seg 3 | D |
| 4 | P2L Seg 1' | D |
| 5 | P2L Seg 4 | D |
| 6 | P2L Seg 5 | D |

Store P2L Segment in an input order

Set Flag D according to Write REQ

221

| Entry | P2L Segment | Flag |
|---|---|---|
| 1 | P2L Seg 1 | U |
| 2 | P2L Seg 2 | U |
| 3 | P2L Seg 3 | D |
| 4 | P2L Seg 1' | D |
| 5 | P2L Seg 4 | D |
| 6 | P2L Seg 5 | D |

Flush P2L Segment, when amount of target P2L Segment ≥ ref value

Target P2L Segment

| Entry | P2L Segment | Flag |
|---|---|---|
| 1 | P2L Seg 2 | U |
| 2 | | |
| 3 | | |
| 4 | | |
| 5 | | |
| 6 | | |

After Flushing Rearrange Entry # → (points to Entry 1)

| Entry | P2L Segment | Flag |
|---|---|---|
| 1 | P2L Seg 1 | D |
| 2 | P2L Seg 2 | D |
| 3 | P2L Seg 3 | D |
| 4 | P2L Seg 1' | D |
| 5 | | |
| 6 | | |

Flush P2L Segment, when amount of target P2L Segment ≥ ref value

Set Flag D according to Write REQ

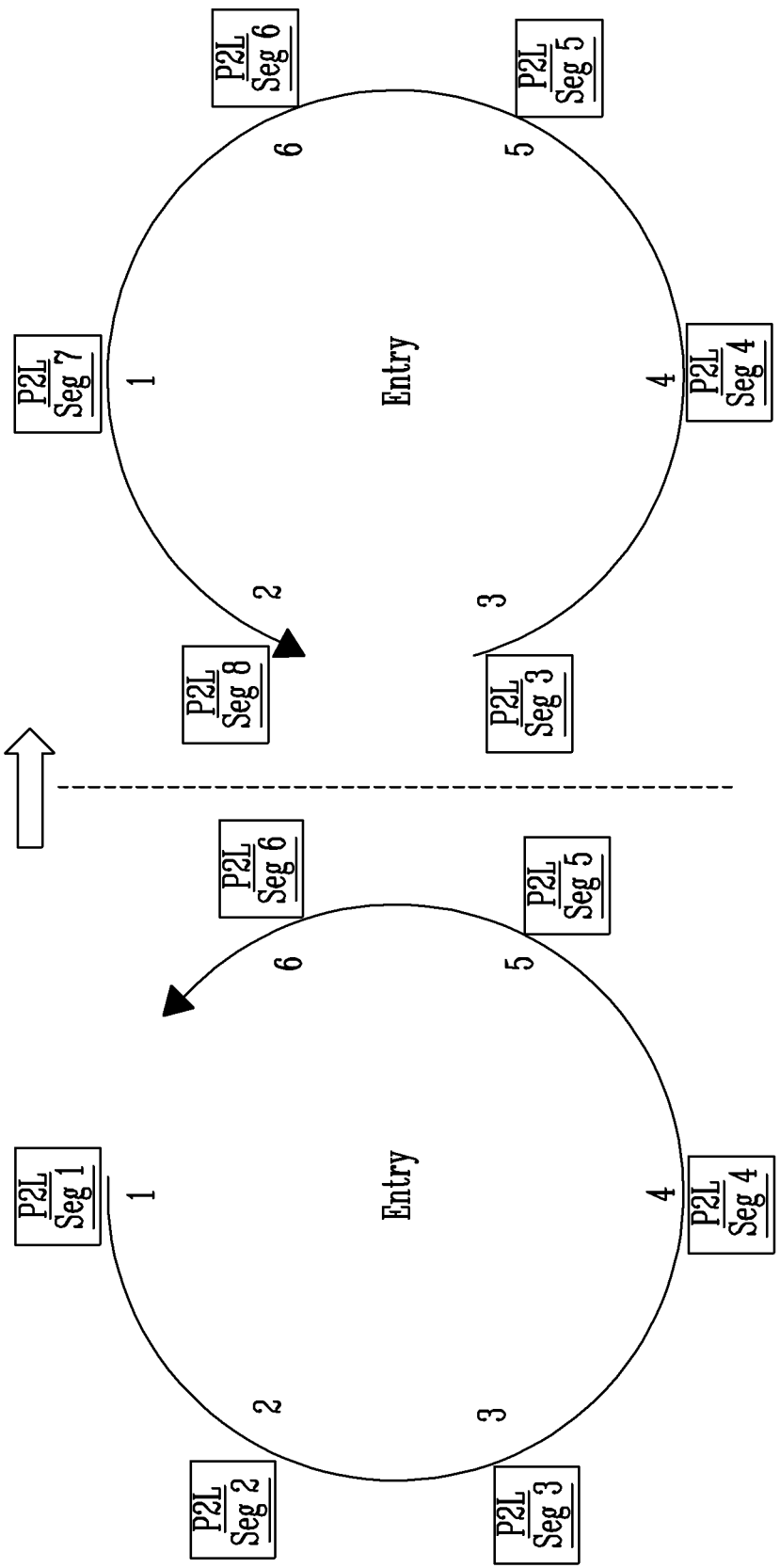

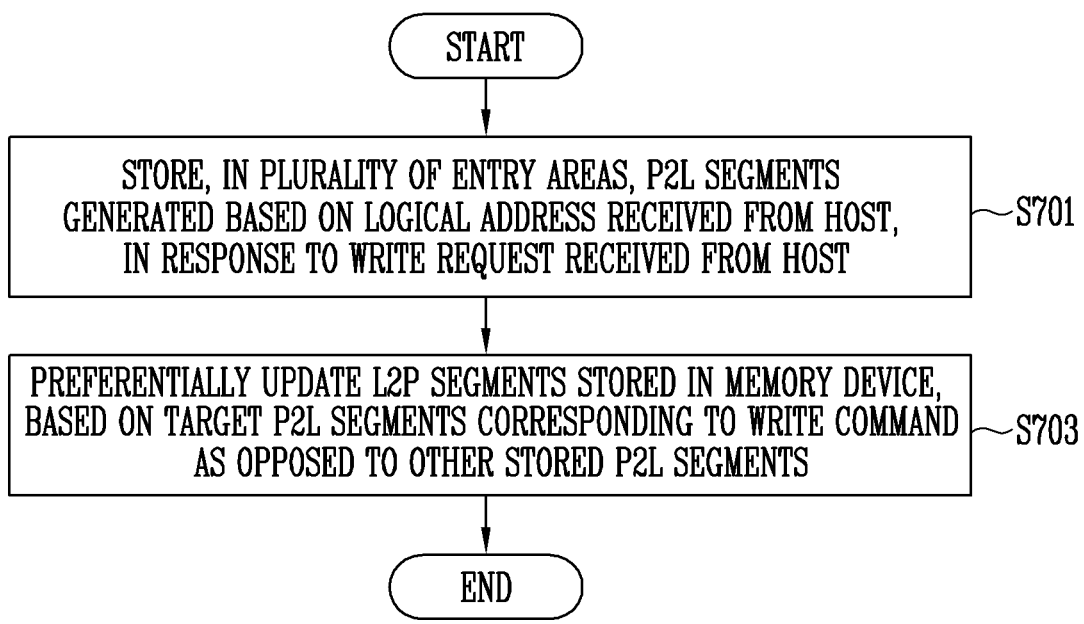
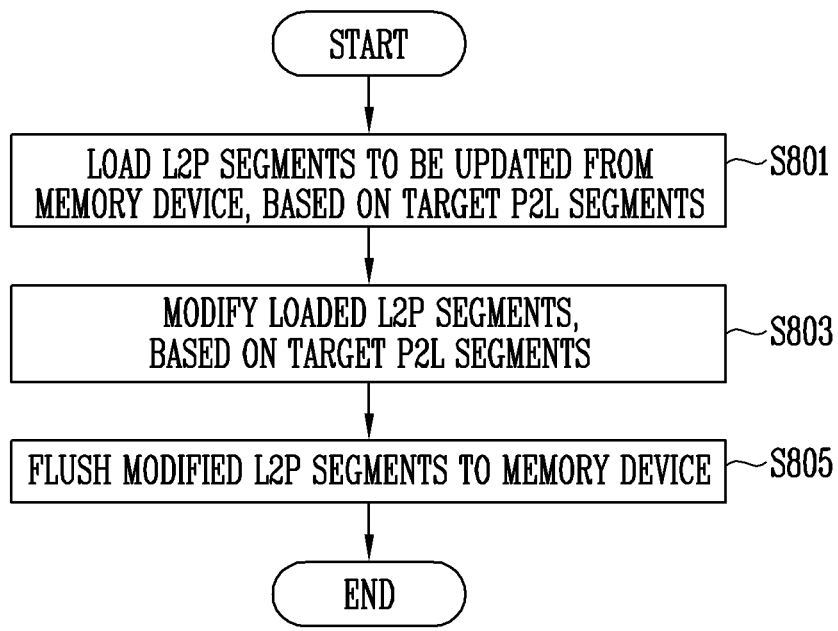

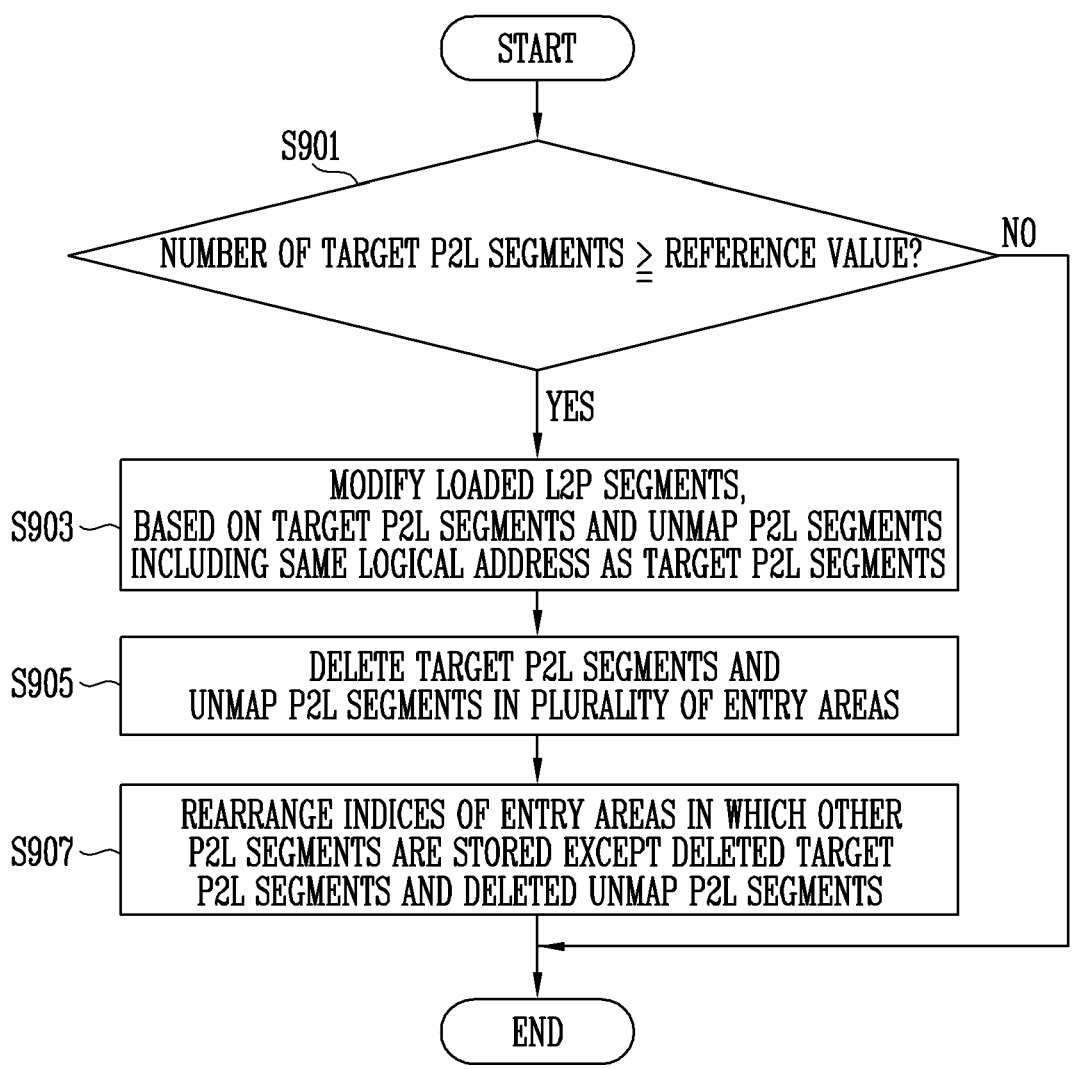

MEMORY CONTROLLER MANAGING MAP DATA AND OPERATING METHOD THEREOF

CROSS-REFERENCE TO RELATED APPLICATION

The present application claims priority under 35 U.S.C. § 119(a) to Korean patent application number 10-2020-0083041, filed on Jul. 6, 2020, which is incorporated herein by reference in its entirety.

BACKGROUND

1. Field of Invention

The present disclosure generally relates to an electronic device, and more particularly, to a memory controller and an operating method thereof.

2. Description of Related Art

A storage device stores data under the control of a host device such as a computer or a smart phone. The storage device may include a memory device which stores data and a memory controller which controls the memory device. The memory device may be a volatile memory device or a nonvolatile memory device.

In a volatile memory device data is stored only when power is supplied, and stored data is lost when the supply of power is interrupted. Examples of volatile memory devices include a static random access memory (SRAM), a dynamic random access memory (DRAM), and the like.

In a nonvolatile memory device data is retained even when the supply of power is interrupted. Examples of nonvolatile memory devices include a read only memory (ROM), a programmable ROM (PROM), an electrically programmable ROM (EPROM), an electrically erasable ROM (EEROM), a flash memory, and the like.

SUMMARY

Embodiments provide a memory controller having improved map update performance and an operating method thereof.

In accordance with an aspect of the present disclosure, there is provided a memory controller for controlling a memory device which stores logical-to-physical (L2P) segments, the memory controller including: a map data storage configured to store a plurality of physical-to-logical (P2L) segments, each including mapping information between a physical address of the memory device in which write data is to be stored and a logical address received from a host, in response to a write request received from the host; and a map manager configured to update the L2P segments stored in the memory device, based on target P2L segments corresponding to a write command provided to the memory device, which have a higher priority than the other P2L segments among the plurality of P2L segments, wherein each of the L2P segments includes mapping information between a logical address and a physical address of data stored in the memory device.

In accordance with another aspect of the present disclosure, there is provided a method for operating a memory controller for controlling a memory device which stores Logical-to-Physical (L2P) segments, the method including: storing a plurality of physical-to-logical (P2L) segments, each including mapping information between a physical address of the memory device in which write data is to be stored and a logical address from a host, in response to a write request received from the host; and updating the L2P segments stored in the memory device, based on target P2L segments corresponding to a write command provided to the memory device, which have a higher priority than the other P2L segments among the plurality of P2L segments, wherein each of the L2P segments includes mapping information between a logical address and a physical address of data stored in the memory device.

In accordance with another aspect of the present disclosure, there is provided a storage device comprising: a memory device storing a plurality of logical-to-physical (L2P) map segments; and a memory controller, coupled to the memory device, and configured to: store a plurality of physical-to-logical (P2L) map segments in response to one or more unmap or write requests from a host; determine target P2L map segments corresponding to the write requests among the plurality of P2L map segments; modify L2P map segments that correspond to the target P2L map segments and unmap P2L map segments associated with the target P2L map segments, which have a higher priority than L2P map segments that correspond to the other P2L map segment among the plurality of P2L map segments; and flush the modified L2P map segments to the memory device.

BRIEF DESCRIPTION OF THE DRAWINGS

Various embodiments are described more fully below with reference to the accompanying drawings; however, the invention may be embodied in different forms and thus should not be construed as limited to the embodiments set forth herein. Rather, these embodiments are provided so that this disclosure is thorough and complete and fully conveys the scope of the embodiments to those skilled in the art. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

In the drawing figures, dimensions may be exaggerated for clarity of illustration. It will be understood that when an element is referred to as being "between" two elements, it can be the only element between the two elements, or one or more intervening elements may also be present.

Like reference numerals refer to like elements throughout.

FIG. 1 is a diagram illustrating a storage device in accordance with an embodiment of the present disclosure.

FIG. 2 is a diagram illustrating a configuration and an operation of a computing system.

FIG. 3 is a diagram illustrating a physical-to-logical (P2L) segment in accordance with an embodiment of the present disclosure.

FIG. 4A is a diagram illustrating map data management in accordance with an embodiment of the present disclosure.

FIG. 4B is a diagram illustrating map data management in accordance with an embodiment of the present disclosure.

FIG. 4C is a diagram illustrating map data management in accordance with an embodiment of the present disclosure.

FIG. 4D is a diagram illustrating map data management in accordance with an embodiment of the present disclosure.

FIG. 4E is a diagram illustrating map data management in accordance with an embodiment of the present disclosure.

FIG. 5 is a diagram illustrating map data management in accordance with an embodiment of the present disclosure.

FIG. 6 is a diagram illustrating an entry area having a circular structure of a first map storage shown in FIG. 2.

FIG. 7 is a flowchart illustrating a map update operation in accordance with an embodiment of the present disclosure.

FIG. 8 is a flowchart illustrating in detail the map update operation shown in FIG. 7.

FIG. 9 is a flowchart illustrating processing of target physical-to-logical (P2L) segments shown in FIG. 8.

Figure 1:
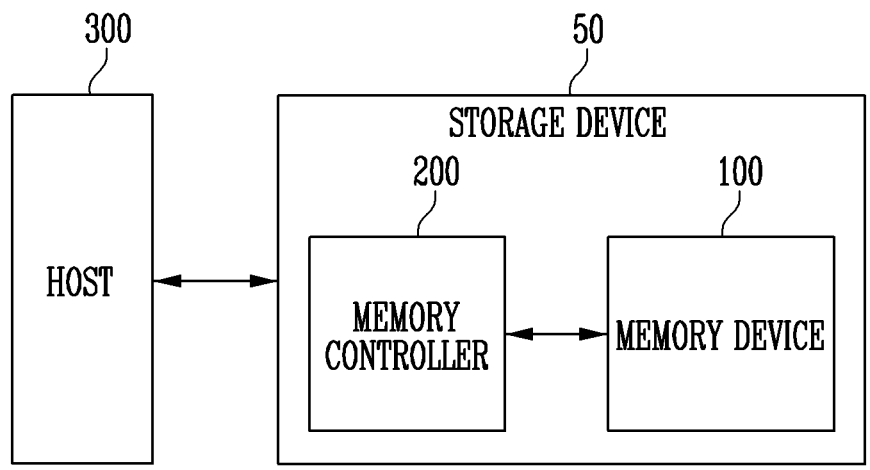
Figure 10:
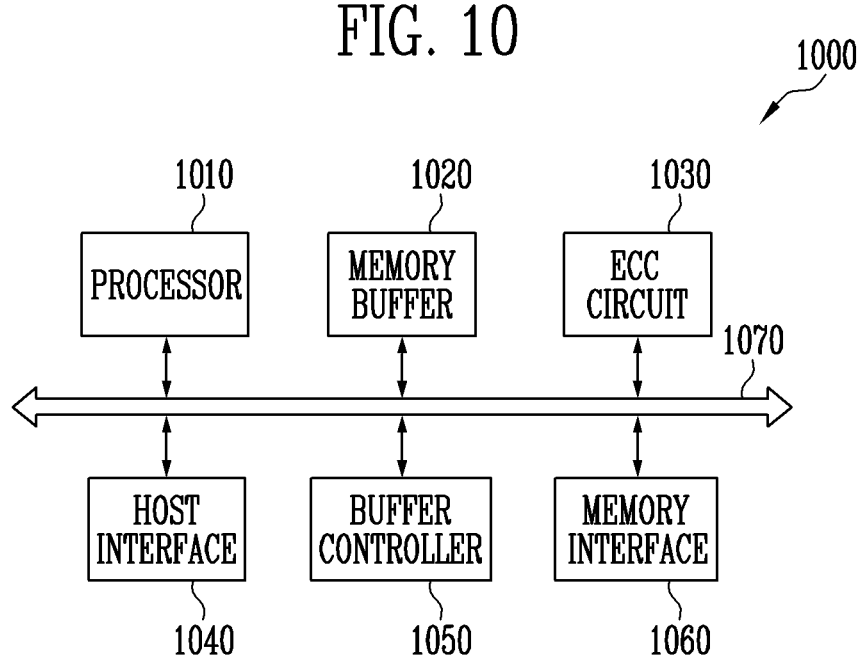

FIG. 10 is a diagram illustrating another embodiment of a memory controller shown in FIG. 1.

Figure 11:
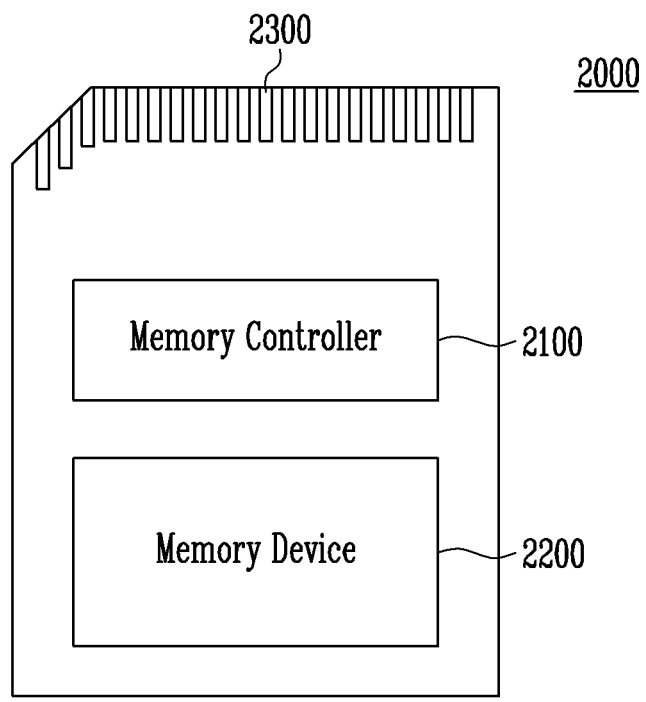

FIG. 11 is a block diagram illustrating a memory card system to which the storage device is applied in accordance with an embodiment of the present disclosure.

Figure 12:
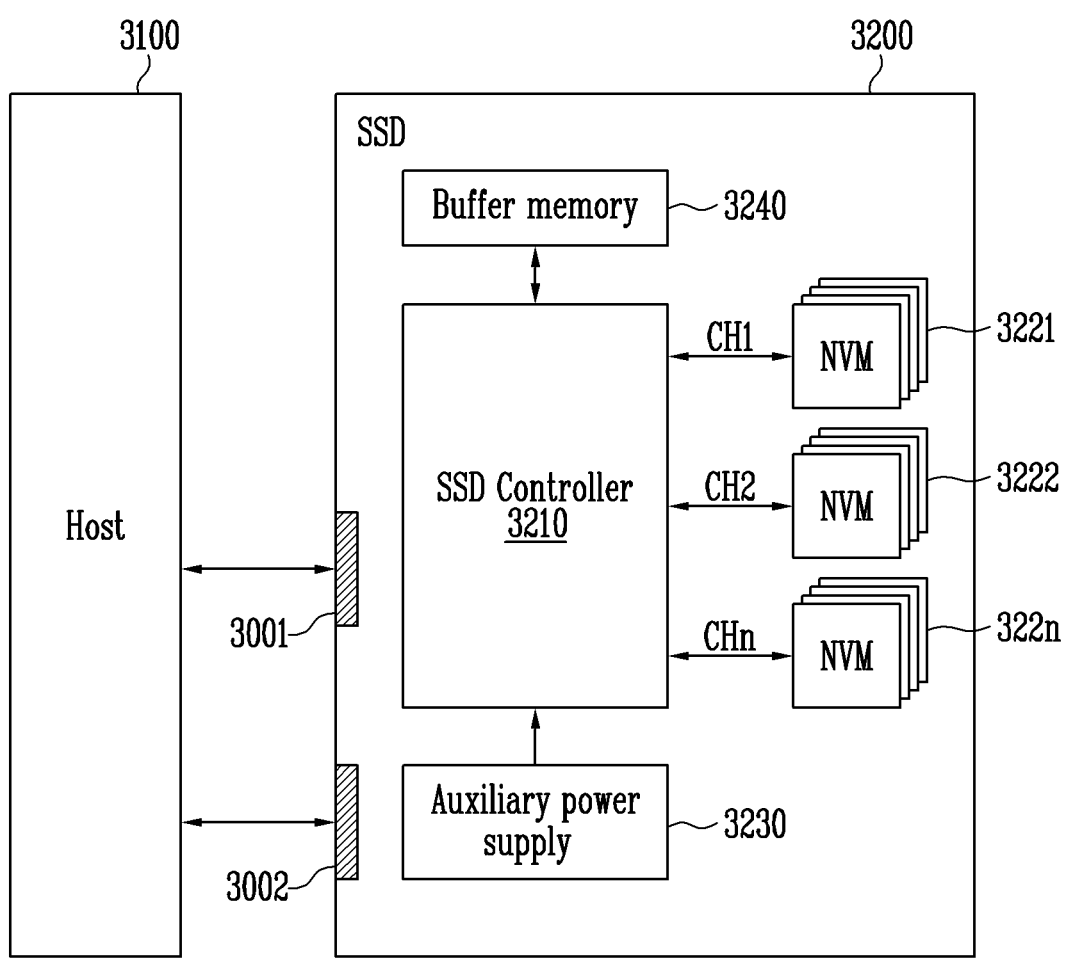

FIG. 12 is a block diagram illustrating a solid state drive (SSD) system to which the storage device is applied in accordance with an embodiment of the present disclosure.

Figure 13:
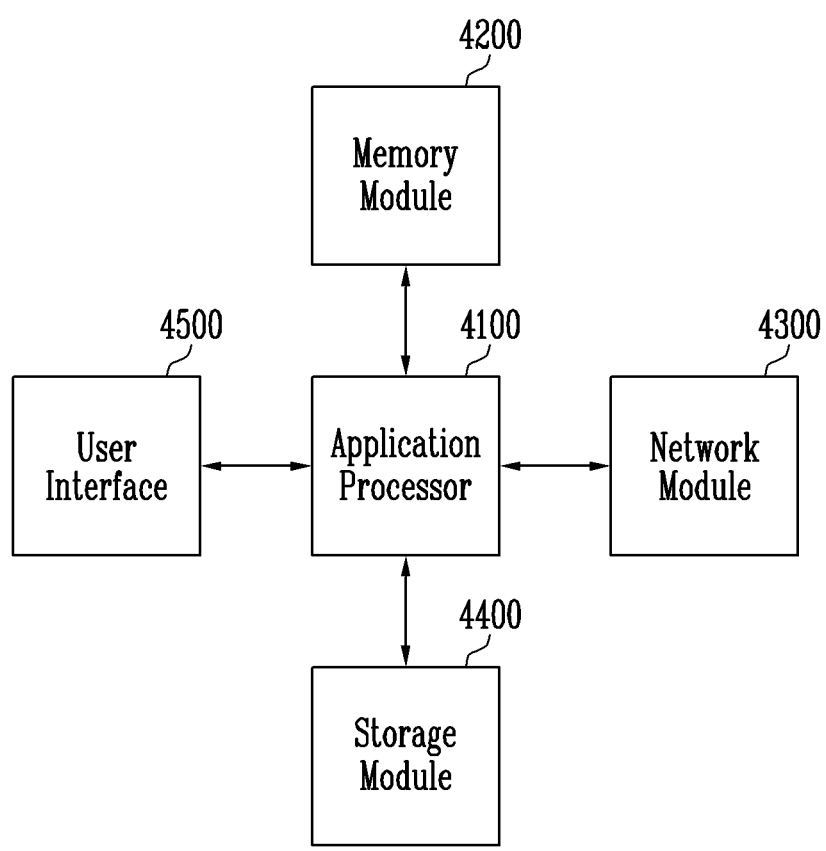

FIG. 13 is a block diagram illustrating a user system to which the storage device is applied in accordance with an embodiment of the present disclosure.

DETAILED DESCRIPTION

The specific structural and functional description is directed to embodiments of the present disclosure. The invention, however, can be implemented in various forms, and thus is not limited to the embodiments set forth herein.

FIG. 1 is a diagram illustrating a storage device 50 in accordance with an embodiment of the present disclosure.

Referring to FIG. 1, the storage device 50 may include a memory device 100 and a memory controller 200 configured to control operation of the memory device 100. The storage device 50 may store data under the control of a host 300, such as a mobile phone, a smart phone, an MP3 player, a laptop computer, a desktop computer, a game console, a TV, a tablet PC or an in-vehicle infotainment.

The storage device 50 may be configured as any of various types of storage devices according to a host interface that is a communication scheme with the host 300. For example, the storage device 50 may be implemented with any of a variety of types of storage devices, such as a Solid State Drive (SSD), a Multi-Media Card (MMC) in the form of an Embedded MMC (eMMC), a Reduced Size MMC (RS-MMC), and a micro-MMC (micro-MMC), a Secure Digital (SD) card in the form of a mini-SD card, a micro-SD card, a Universal Serial Bus (USB) storage device, a Universal Flash Storage (UFS) device, a Compact Flash (CF) card, a Smart Media Card (SMC), and/or a memory stick.

The storage device 50 may be manufactured as any of various kinds of package types, such as a Package-On-Package (POP), a System-In-Package (SIP), a System-On-Chip (SOC), a Multi-Chip Package (MCP), a Chip-On-Board (COB), a Wafer-level Fabricated Package (WFP), and/or a Wafer-level Stack Package (WSP).

The memory device 100 may store data. The memory device 100 operates under the control of the memory controller 200. The memory device 100 may include a memory cell array including a plurality of memory cells for storing data.

Each of the memory cells may be configured as a Single Level Cell (SLC) storing one bit of data, a Multi-Level Cell (MLC) storing two bits of data, a Triple Level Cell (TLC) storing three bits of data, or a Quad Level Cell (QLC) storing four bits of data.

The memory cell array may include a plurality of memory blocks. Each memory block may include a plurality of memory cells. One memory block may include a plurality of pages. In an embodiment, the page may be a unit for storing data in the memory device 100 or reading data stored in the memory device 100. The memory block may be a unit for erasing data.

In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, by way of example, the memory device 100 is a NAND flash memory and various features and aspects of the invention are described in that context.

The memory device 100 receives a command and an address from the memory controller 200 and accesses an area selected by the address in the memory cell array. That is, the memory device 100 may perform an operation instructed by the command on the area selected by the address. For example, the memory device 100 may perform a write (program) operation, a read operation, and an erase operation. In the program operation, the memory device 100 may program data in the area selected by the address. In the read operation, the memory device 100 may read data from the area selected by the address. In the erase operation, the memory device 100 may erase data stored in the area selected by the address.

In an embodiment, the memory device 100 may store a plurality of logical-to-physical (L2P) segments. Each of the L2P segments may include mapping information between a logical address and a physical address of data stored in the memory device.

When power is applied to the storage device 50, the memory controller 200 may execute firmware (FW). When the memory device 100 is a flash memory device, the memory controller 200 may execute FW such as a flash translation layer (FTL) for controlling communication between the host 300 and the memory device 100.

In an embodiment, the memory controller 200 may receive data and a logical block address (LBA) from the host 300, and translate the LBA into a physical block address (PBA) representing addresses of memory cells included in the memory device 100, in which data is to be stored.

The memory controller 200 may control the memory device 100 to perform a program operation, a read operation, an erase operation, or the like in response to a request from the host 300. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

In an embodiment, the memory controller 200 may autonomously generate a command, an address, and data in the absence of a request from the host 300, and transmit the command, the address, and the data to the memory device 100. For example, the memory controller 200 may provide the command, the address, and the data to the memory device 100 to perform a background operation such as wear leveling and garbage collection.

In an embodiment, the memory controller 200 may control two or more memory devices 100. The memory controller 200 may control the memory devices according to an interleaving scheme so as to improve operational performance. The interleaving scheme may be an operating scheme that allows operations to be performed on at least two memory devices 100 in at least partially overlapping time periods.

In an embodiment, the memory controller 200 may receive a write request and a logical address associated with write data from the host 300. The memory controller 200 may map the received logical address to a physical address of the memory device 100 in which the write data is to be stored. The memory controller 200 may store a plurality of physical-to-logical (P2L) segments including mapping information between the logical address and the physical address. In an embodiment, the P2L segment may be mapping information aligned with respect to the physical address, as mapping information between the logical address received from the host 300 and the physical address of the memory device 100 in which the write data is to be stored.

The memory controller 200 may update L2P segments stored in the memory device 100, based on target P2L segments satisfying a particular condition among the plurality of P2L segments. In an embodiment, the L2P segment may be mapping information aligned with respect to the logical address, as mapping information between the logical address received from the host 300 and the physical address of the memory device 100 in which the write data is to be stored.

The target P2L segments corresponding to the condition may be P2L segments corresponding to a write command which the memory controller 200 provides to the memory device 100. For example, the memory controller 200 may provide the memory device 100 with a physical address at which write data is to be stored together with the write command. A P2L segment corresponding to the write command may be a P2L segment including the physical address provided together with the write command.

The memory controller 200 may update L2P segments stored in the memory device 100, based on the target P2L segments according to a result obtained by comparing the number of target P2L segments with a reference value. For example, when the number of target P2L segments is greater than or equal to the reference value, the memory controller 200 may update the L2P segments stored in the memory device 100, based on the target P2L segments.

For example, the memory controller 200 may load L2P segments to be updated among the L2P segments stored in the memory device 100, based on the target L2P segments. The L2P segments to be updated may include logical addresses such as a logical address included in the target P2L segments.

The memory controller 200 may modify the loaded L2P segments to be updated, based on the target P2L segments. The memory controller 200 may flush the modified L2P segments to the memory device 100. The memory device 100 may update the stored L2P segments, based on the flushed L2P segments.

The host 300 may communicate with the storage device 50 by using at least one of various communication protocols, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and/or a Load Reduced DIMM (LRDIMM).

Figure 2:
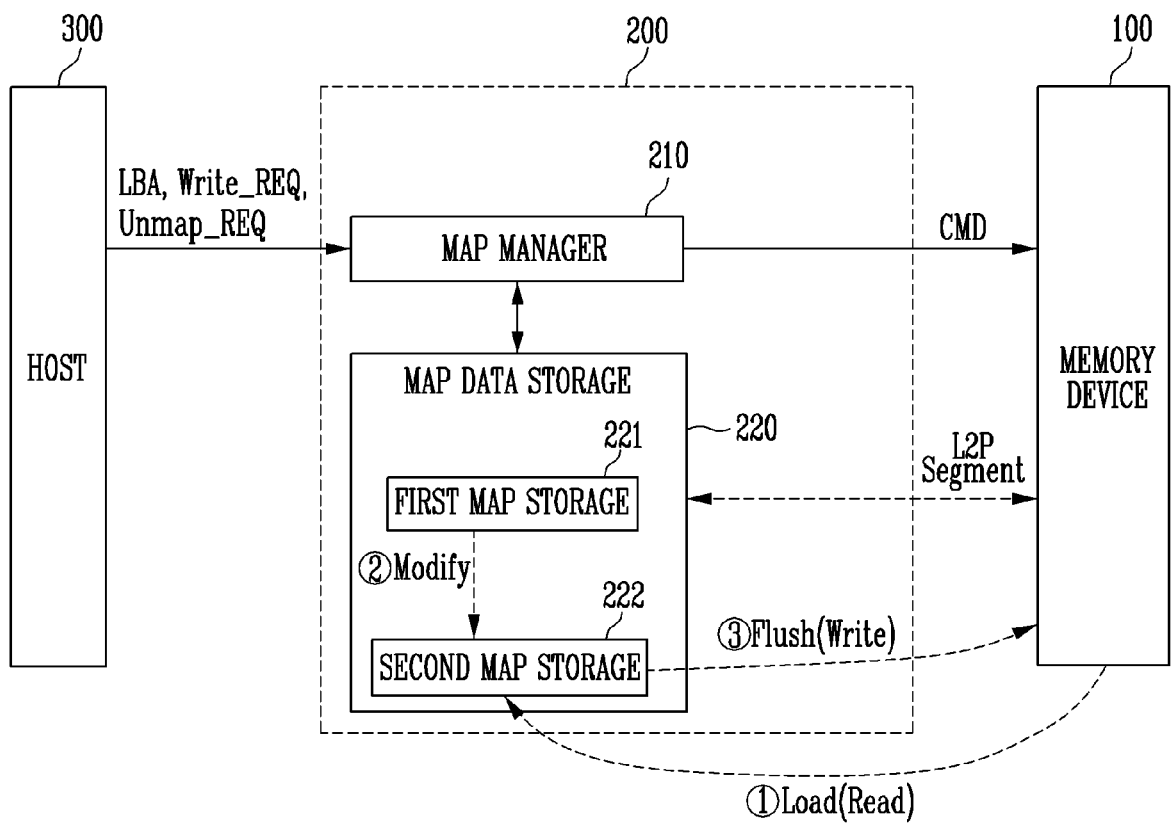

FIG. 2 is a diagram illustrating a configuration and an operation of a computing system.

Referring to FIG. 2, the computing system may include a memory device 100, a memory controller 200, and a host 300.

The memory device 100 may store a plurality of logical-to-physical (L2P) segments. The L2P segments may include mapping information between a logical address and a physical address of data stored in the memory device 100.

The memory controller 200 may include a map manager 210 and a map data storage 220. The map data storage 220 may include a first map storage 221 and a second map storage 222.

The map manager 210 may receive a write request Write_REQ and a logical address associated with write data from the host 300. The map manager 210 may map the received logical address to a physical address of the memory device 100 in which the write data is to be stored. The map manager 210 may store, in the first map storage 221, a plurality of physical-to-logical (P2L) segments including mapping information between the logical address and the physical address. The map manager 210 may receive an unmap request Unmap_REQ and an unmap-requested logical address from the host 300. The map manager 210 may store, in the first map storage 221, unmap P2L segments including mapping information between the unmap-requested logical address and unmap data. The unmap data may be a value representing that the mapped logical address is the unmap-requested logical address.

The map manager 210 may update the L2P segments stored in the memory device 100, based on target P2L segments satisfying a particular condition among the plurality of P2L segments stored in the first map storage 221.

The target P2L segments satisfying the condition may be P2L segments corresponding to a write command which the memory controller 200 provide to the memory device 100. For example, the memory controller 200 may provide the memory device 100 with a physical address at which write data is to be stored together with the write command. A P2L segment corresponding to the write command may be a P2L segment including the physical address provided together with the write command.

The map manager 210 may flush the target P2L segments from the first map storage 221, based on a result obtained by comparing the number of target P2L segments stored in the first map storage 221 with a reference value. In an embodiment, the flushing on the target P2L segments may mean modifying L2P segments loaded to the second map storage 222, based on the target P2L segments, and deleting the target P2L segments from the first map storage 221. When the target P2L segments are deleted from the first map storage 221, indices of a plurality of entry areas included in the first map storage 221 may be rearranged. For example, the map manager 210 may flush the target P2L segments from the first map storage 221, when the number of the target P2L segments is greater than or equal to the reference value.

The map manager 210 may also flush unmap P2L segments corresponding to the target P2L segments among the plurality of P2L segments stored in the first map storage 221. The unmap P2L segments may include the same logical address as the target P2L segments, and flag information may be a P2L segment set as an unmap segment.

The target P2L segments and the unmap P2L segments are flushed together, so that map data disturb may be prevented.

Map data disturb may be caused when old P2L segments and new P2L segments are separately flushed with respect to the same logical address.

The map manager 210 may rearrange indices of entry areas in which P2L segments other than the target P2L segments and the unmap P2L segments among the plurality of P2L segments stored in the first map storage 221 are stored. Whenever the map manager 210 flushes P2L segments from the first map storage 221, the map manager 210 rearranges the indices of the entry areas in which the other P2L segments stored in the first map storage 221 are stored, so that the P2L segments stored in the first map storage 221 may be managed in a circular structure.

The map manager 210 may update the L2P segments stored in the memory device 100, based on the flushed target P2L segments.

For example, the map manager 210 may load, to the second map storage 222, L2P segments to be updated among the L2P segments stored in the memory device 100, based on the flushed target P2L segments. The L2P segments to be updated may include logical addresses such as a logical address included in the target P2L segments.

The map manager 210 may modify the L2P segments to be updated, which are loaded to the second map storage 222, based on the target P2L segments. The map manager 210 may flush the modified L2P segments to the memory device 100. The memory device 100 may update the stored L2P segments, based on the flushed L2P segments.

When the plurality of entry areas included in the first map storage 221 are completely filled, the map manager 210 may flush a set number of P2L segments among the plurality of P2L segments stored in the first map storage 221. This is to prevent a situation from arising in which there is no spare entry area to accommodate storage of a new P2L segment, even when the number of target P2L segments stored in the plurality of entry areas is less than the reference value. The map manager 210 may flush the set number of P2L segments in the order in which the P2L segments are input to the first map storage 221. The flushed P2L segment may include one of a data segment and an unmap segment.

The map manager 210 may set flag information corresponding to each of the plurality P2L segments stored in the first map storage 221 according to the write request Write_REQ or the unmap request Unmap_REQ, which is received from the host 300.

The map manager 210 may set, as a data segment, flag information corresponding to a P2L segment stored in the first map storage 221 according to the write request. The map manager 210 may set, as an unmap segment, flag information of P2L segments corresponding to the unmap request among the plurality of P2L segments stored in the first map storage 221, in response to the unmap request.

The first map storage 221 may include a plurality of entry areas. The first map storage 221 may store, in the plurality of entry areas, a plurality of P2L segments and flag information corresponding to each of the plurality of P2L segments, in the order in which the P2L segments and the flag information are input to the first map storage 221. The flag information may represent whether a corresponding P2L segment is a data segment or an unmap segment. In an embodiment, the first map storage 221 may store a P2L table including a plurality of P2L segments.

When a selected P2L segment among the plurality of P2L segments stored in the first map storage 221 is flushed, indices of entry areas in which P2L segments remaining in the first map storage 221 are stored may be rearranged.

The second map storage 222 may load, from the memory device 100, L2P segments to be updated among the L2P segments stored in the memory device 100. In an embodiment, the second map storage 222 may store an L2P table including at least one L2P segment. The L2P segments loaded to the second map storage 222 may be modified by the map manager 210, based on the target P2L segments. The modified L2P segments may be again flushed to the memory device 100. The memory device 100 may update L2P segments which were previously stored in the memory device 100, based on the flushed L2P segments.

FIG. 3 is a diagram illustrating a physical-to-logical (P2L) segment in accordance with an embodiment of the present disclosure.

Referring to FIG. 3, in an embodiment, a physical address PPN may include a block number BLK # of a block in which a physical page is included and an offset Offset representing a position of the physical page in the corresponding block. In various embodiments, when physical addresses are continuous, a physical address may be designated as a start address and a length of the physical address from the start address.

In FIG. 3, one open block (e.g., the first block BLK1) may include four physical pages (e.g., pages corresponding to PPN1 to PPN4). The number of physical pages included in an open block is not limited to four. One P2L segment P2L Seg may include three pairs of mapping items, each mapping a logical page to a physical page. The number of pairs of mapping items included in one P2L segment is not limited to three.

In FIG. 3, continuous logical addresses LBA1 to LBA12 at which write data is to be stored may be provided together with write data from the host 300. A write operation of storing write data in first to third open blocks BLK1 to BLK3 may be performed. The write operation may be sequentially performed in the order of the first open block BLK1, the second open block BLK2, and the third open block BLK3.

Therefore, write data may be sequentially stored at physical addresses PPN1 to PPN4 of the first open block BLK1, and the physical addresses PPN1 to PPN4 may be mapped one-to-one to logical addresses LBA1 to LBA4, respectively.

Specifically, since the physical address PPN1 has a block number BLK # of 1 and an offset Offset of 1, the physical address PPN1 may be an address of a first physical page in the first open block BLK1. When write data corresponding to the logical address LBA1 is stored at the physical address PPN1, map data including mapping information between the physical address PPN1 and the logical address LBA1 may be generated. In this manner, map data including mapping information between the physical addresses PPN2 to PPN4 and the logical addresses LBA2 to LBA4 may be generated.

Subsequently, write data may be sequentially stored at physical addresses PPN5 to PPN8 of the second open block BLK2, and the physical addresses PPN5 to PPN8 may be mapped one-to-one to logical addresses LBA9 to LBA12, respectively. Write data may be sequentially stored at physical addresses PPN9 to PPN12 of the third open block BLK3, and the physical addresses PPN9 to PPN12 may be mapped one-to-one to logical addresses LBA5 to LBA8, respectively.

In FIG. 3, a first P2L segment P2L Seg1 may include mapping information on the physical addresses PPN1 to PPN3. A second P2L segment P2L Seg2 may include mapping information on physical addresses PPN4 to PPN6. A third P2L segment P2L Seg3 may include mapping information on physical addresses PPN7 to PPN9. A fourth P2L segment P2L Seg4 may include mapping information on physical addresses PPN10 to PPN12.

The P2L segment may be map data which is generated in a manner that allocates a logical address to a physical address at which write data is stored, and is aligned based on the physical address.

Figures 4A, 4B:
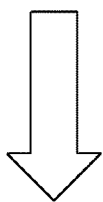

FIG. 4A is a diagram illustrating map data management in accordance with an embodiment of the present disclosure.

Referring to FIG. 4A, the first map storage 221 in FIG. 2 may include a plurality of entry areas.

In FIG. 4A, the first map storage 221 may include first to sixth entry areas Entry 1 to Entry 6. The number of entry areas included in the first map storage 221 is not limited to six.

Each entry area may store a physical-to-logical (P2L) segment including mapping information between a physical address of the memory device 100 in which write data is to be stored and a logical address received from the host 300.

In FIG. 4A, first to third P2L segments P2L Seg 1 to P2L Seg 3 may be generated based on the logical addresses together with a write request from the host 300. The first to third P2L segments P2L Seg 1 to P2L Seg 3 may be stored in the order in which they are input to the first to third entry areas Entry 1 to Entry 3. Flag information corresponding to each of the first to third P2L segments P2L Seg 1 to P2L Seg 3 may be set as a data segment D according to the write request.

FIG. 4B is a diagram illustrating map data management in accordance with an embodiment of the present disclosure.

Referring to FIG. 4B, as compared with FIG. 4A, flag information corresponding to each of the first and second P2L segments P2L Seg 1 and P2L Seg 2 may be set as an unmap segment U according to an unmap request received from the host 300. Each of the first and second P2L segments P2L Seg 1 and P2L Seg 2 may include an unmap-requested logical address.

Figures 4C, 4D:
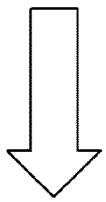

FIG. 4C is a diagram illustrating map data management in accordance with an embodiment of the present disclosure.

Referring to FIG. 4C, as compared with FIG. 4B, fourth to sixth P2L segments P2L Seg 1', P2L Seg 4, and P2L Seg 5 may be generated based on logical addresses received together with a write request from the host 300. The fourth to sixth P2L segments P2L Seg 1', P2L Seg 4, and P2L Seg 5 may be stored in the order in which they are input to the fourth to sixth entry areas Entry 4 to Entry 6. Flag information corresponding to each of the fourth to sixth P2L segments P2L Seg 1', P2L Seg 4, and P2L Seg 5 may be set as a data segment D according to the write request. The fourth P2L segment P2L Seg 1' may include a logical address equal to that included in the first P2L segment P2L Seg 1.

FIG. 4D is a diagram illustrating map data management in accordance with an embodiment of the present disclosure.

Referring to FIG. 4D, it is illustrated that a target P2L segment may satisfy a particular condition.

In an embodiment, the condition may mean a P2L segment corresponding to a write command provided to the memory device 100. Therefore, the third to sixth P2L segments P2L Seg 3, P2L Seg 1', P2L Seg 4, and P2L Seg 5, each of which flag information is set as a data segment D, may be target P2L segments.

When a number of the target P2L segments is greater than or equal to a reference value, the target P2L segments may be flushed from the first map storage 221. In FIG. 4D, the reference value is 4, by way of example. Any suitable reference value may be used. The reference value may be a number of P2L segments, in which update time-out does not occur when P2L segments are flushed.

Since the number of the target P2L segments is greater than or equal to 4 (the reference value), the third to sixth P2L segments P2L Seg 3, P2L Seg 1', P2L Seg 4, and P2L Seg 5 may be flushed.

An unmap P2L segment corresponding to the fourth P2L segment P2L Seg 1' among the flushed target P2L segments may also be flushed. The unmap P2L segment corresponding to the fourth P2L segment P2L Seg 1' may be the first P2L segment P2L Seg 1. The first P2L segment P2L Seg 1 may include a logical address equal to that included in the fourth P2L segment P2L Seg 1, and flag information may be a P2L segment set as an unmap segment U.

Target P2L segments and unmap P2L segments corresponding to the target P2L segments are flushed together, so that an update of newest map data may be normally performed.

FIG. 4E is a diagram illustrating map data management in accordance with an embodiment of the present disclosure.

Referring to FIG. 4E, as compared with FIG. 4D, an index of an entry area in which P2L segments other than those flushed and unmap P2L segments corresponding to the target P2L segments, among the plurality of P2L segments stored in the first map storage 221, are stored may be rearranged.

Therefore, an index of the second entry area Entry 2 in which the second P2L segment P2L Seg 2 remaining in the first map storage 221 is stored may be rearranged.

Indices of entry areas included in the first map storage 221 may be managed in a circular structure. Therefore, since the first P2L segment P2L Seg 1 stored in a first entry area Entry 1, which has a ranking higher than that of the second entry area Entry 2, has been flushed, an index of the first entry area Entry 1 may be rearranged to have a lower order, e.g., be moved to the lowest ordered position, according to the circular structure. The index of the second entry area Entry 2 may be arranged to move up in the order, e.g., moved to the first or highest ordered position.

FIG. 5 is a diagram illustrating map data management in accordance with an embodiment of the present disclosure.

Referring to FIG. 5, the first map storage 221 may include first to sixth entry areas Entry 1 to Entry 6. The number of entry areas included in the first map storage 221 is not limited to six.

Each entry area may store a physical-to-logical (P2L) segment including mapping information between a physical address of the memory device 100 in which write data is to be stored and a logical address received from the host 300.

In FIG. 5, first to third P2L segments P2L Seg 1 to P2L Seg 3 may be generated based on the logical addresses received together with a write request from the host 300. The first to third P2L segments P2L Seg 1 to P2L Seg 3 may be stored in the order in which the first to third P2L segments P2L Seg 1 to P2L Seg 3 are input to the first to third entry areas Entry 1 to Entry 3. Flag information corresponding to each of the first to third P2L segments P2L Seg 1 to P2L Seg 3 may be set as a data segment D according to the write request.

A fourth P2L segment P2L Seg 1' may be generated based on a logical address received together with a newly received write request from the host 300. The fourth P2L segment P2L Seg 1' may be stored in the fourth entry area Entry 4. Flag information corresponding to the fourth P2L segment P2L Seg 1' may be set as a data segment D according to the write request.

The fourth P2L segment P2L Seg 1' may include a logical address equal to that included in the first P2L segment P2L Seg 1. That is, the first P2L segment P2L Seg 1 may be old map data, and the fourth P2L segment P2L Seg 1' may be latest map data.

The first to fourth P2L segments P2L Seg 1 to P2L Seg 3 and P2L Seg 1, each of which flag information is set as a data segment D, may be target P2L segments. In FIG. 5, assuming that the reference value is 4, a number of the target P2L segments is greater than or equal to 4, and hence the target P2L segments may be flushed from the first map storage 221.

Although the first P2L segment P2L Seg 1 as the old map data is flushed, the fourth P2L segment P2L Seg 1' as the latest map data is also flushed, and therefore, a map update may be performed by using the latest map data.

FIG. 6 is a diagram illustrating an entry area having the circular structure of the first map storage 221 shown in FIG. 2.

Referring to FIG. 6, the first map storage 221 may include first to sixth entry areas Entry 1 to Entry 6. The number of entry areas included in the first map storage 221 is not limited to six. Indices of the first to sixth entry areas Entry 1 to Entry 6 may be managed in the circular structure. The order in which a P2L segment stored in the first map storage is flushed may be determined according to index rankings of the entry areas. When a P2L segment stored in the first map storage 221 is flushed, indices of entry areas in which the other P2L segments are stored may be rearranged.

For example, first to sixth P2L segments P2L Seg 1 to P2L Seg 6 may be stored in the order in which they are input to the first to sixth entry areas Entry 1 to Entry 6. The first to fourth P2L segments P2L Seg 1 to P2L Seg 4 may be target P2L segments. Assuming that two P2L segments are flushed at a time from the first map storage 221, the first and second P2L segments P2L Seg 1 and P2L Seg 2 stored in the first and second entry areas Entry 1 and Entry 2, which have high index rankings may be preferentially flushed.

When the first and second P2L segments P2L Seg 1 and P2L Seg 2 are flushed, the first entry area may be rearranged to have a ranking lower than that of the sixth entry area Entry 6, which, before the flush, had the lowest ranking. The second entry area Entry 2 may be rearranged to have a ranking lower than the new ranking of the first entry area Entry 1.

Seventh and eighth P2L segments P2L Seg 7 and P2L Seg 8 input after the entry areas are rearranged may be stored in the first and second entry areas Entry 1 and Entry 2. The seventh and eighth P2L segments P2L Seg 7 and P2L Seg 8 may become target P2L segments.

Subsequently, the third and fourth P2L segments P2L Seg 3 and P2L Seg 4 stored in the third and fourth entry areas Entry 3 and Entry 4 having high index rankings among the target P2L segments may be flushed preferentially, i.e., instead of the seventh and eighth P2L segments P2L Seg 7 and P2L Seg 8.

FIG. 7 is a flowchart illustrating a map update operation in accordance with an embodiment of the present disclosure. The map update operation may be performed by a memory controller, e.g., a memory controller 200 in FIG. 2.

Referring to FIG. 7, in step S701, the memory controller may store, in a plurality of entry areas, P2L segments generated based on logical addresses received from the host, in response to a write request received from the host.

In operation S703, the memory controller may preferentially update L2P segments stored in the memory device, based on target P2L segments corresponding to a write command as opposed to other stored P2L segments.

FIG. 8 is a flowchart illustrating in detail the map update operation shown in FIG. 7.

Referring to FIG. 8, in step S801, the memory controller may load L2P segments to be updated from the memory device, based on target P2L segments.

In operation S803, the memory controller may modify the loaded L2P segments, based on the target P2L segments. In an embodiment, the memory controller may modify the loaded L2P segments, based on a result obtained by comparing a number of the target P2L segments with a reference value. For example, when the number of the target P2L segments is greater than or equal to the reference value, the memory controller may modify the loaded L2P segments, based on the target P2L segments.

In operation S805, the memory controller may flush the modified L2P segments to the memory device. The memory device may update L2P segments which were previously stored in the memory device, based on the flushed L2P segments.

FIG. 9 is a flowchart illustrating processing of the target P2L segments shown in FIG. 8.

Referring to FIG. 9, in step S901, the memory controller may determine whether the number of the target P2L segments is greater than or equal to the reference value. When it is determined that the number of the target P2L segments is greater than or equal to the reference value, the memory controller proceeds to step S903. Otherwise, the memory controller ends the operation.

In operation S903, the memory controller may modify the loaded L2P segments, based on the target P2L segments and unmap P2L segments including the same logical address as the target P2L segments.

In operation S905, the memory controller may delete the target P2L segments and the unmap P2L segments, which are stored in a plurality of entry areas.

In operation S907, the memory controller may rearrange indices of entry areas in which the other P2L segments except the deleted target P2L segments and the deleted unmap P2L segments are stored among the plurality of entry areas.

FIG. 10 is a diagram illustrating another embodiment of the memory controller shown in FIG. 1.

Referring to FIG. 10, a memory controller 1000 is coupled to a host and a memory device. The memory controller 1000 may access the memory device in response to a request received from the host. For example, the memory controller 1000 may control write, read, erase, and background operations of the memory device. The memory controller 1000 may provide an interface between the memory device and the host. The memory controller 1000 may drive firmware for controlling the memory device.

The memory controller 1000 may include a processor 1010, a memory buffer 1020, an error correction code (ECC) circuit 1030, a host interface 1040, a buffer controller 1050, a memory interface 1060, and a bus 1070.

The bus 1070 may be configured to provide channels between components of the memory controller 1000.

The processor 1010 may control overall operation of the memory controller 1000, and perform a logical operation. The processor 1010 may communicate with the external host through the host interface 1040, and communicate with the memory device through the memory interface 1060. Also, the processor 1010 may communicate with the memory buffer 1020 through the buffer controller 1050. The processor 1010 may control an operation of the storage device, using the memory buffer 1020 as a working memory, a cache memory or a buffer memory.

The processor 1010 may perform a function of a flash translation layer (FTL). The processor 1010 may translate a logical block address (LBA) provided by the host through the FTL into a physical block address (PBA). The FTL may receive an LBA, using a mapping table, to translate the LBA into a PBA. Any of several known address mapping methods of the FTL may be used according to the mapping unit used in the system. A page mapping method, a block mapping method, or a hybrid mapping method may be used as applicable.

The processor 1010 may randomize data received from the host. For example, the processor 1010 may randomize data received from the host, using a randomizing seed. The randomized data is provided as data to be stored to the memory device to be programmed in the memory cell array.

In a read operation, the processor 1010 may derandomize data received from the memory device. For example, the processor 1010 may derandomize data received from the memory device, using a derandomizing seed. The derandomized data may be output to the host.

In an embodiment, the processor 1010 may perform randomizing and derandomizing by driving software or firmware.

The memory buffer 1020 may be used as the working memory, the cache memory, or the buffer memory of the processor 1010. The memory buffer 1020 may store codes and commands, which are executed by the processor 1010. The memory buffer 1020 may include a static RAM (SRAM) or a dynamic RAM (DRAM).

The ECC circuit 1030 may perform an ECC operation. The ECC circuit 1030 may perform ECC encoding on data to be written in the memory device. The ECC encoded data may be transferred to the memory device through the memory interface 1060. The ECC circuit 1030 may perform ECC decoding on data received from the memory device through the memory interface 1060. In an embodiment, the ECC circuit 1030 may be disposed in the memory interface 1060.

The host interface 1040 may communicate with the external host under the control of the processor 1010. The host interface 1040 may communicate with the host, using at least one of various communication protocols, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a NonVolatile Memory Express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and/or a Load Reduced DIMM (LRDIMM).

The buffer controller 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

In an embodiment, the memory controller 1000 may not include the memory buffer 1020 and the buffer controller 1050.

In an embodiment, the processor 1010 may control an operation of the memory controller 1000 by using codes. The processor 1010 may load codes from a nonvolatile memory device (e.g., a read only memory (ROM)) provided in the memory controller 1000. In another example, the processor 1010 may load codes from the memory device through the memory interface 1060.

In an embodiment, the bus 1070 of the memory controller 1000 may be divided into a control bus and a data bus. The data bus may be configured to transmit data in the memory controller 1000, and the control bus may be configured to transmit control information such as a command and an address in the memory controller 1000. The data bus and the control bus are separated from each other, so as not to interfere with or influence each other. The data bus may be coupled to the host interface 1040, the buffer controller 1050, the ECC circuit 1030, and the memory interface 1060. The control bus may be coupled to the host interface 1040, the processor 1010, the buffer controller 1050, the memory buffer 1020, and the memory interface 1060.

In an embodiment, the map manager 210 shown in FIG. 2 may be included in the processor 1010. The map data storage 220 shown in FIG. 2 may be included in the memory buffer 1020.

FIG. 11 is a block diagram illustrating a memory card system 2000 to which the storage device is applied in accordance with an embodiment of the present disclosure.

Referring to FIG. 11, the memory card system 2000 includes a memory controller 2100, a memory device 2200, and a connector 2300.

The memory controller 2100 is coupled to the memory device 2200. The memory controller 2100 may access the memory device 2200. For example, the memory controller 2100 may control write, read, erase, and background operations of the memory device 2200. The memory controller 2100 may provide an interface between the memory device 2200 and a host. The memory controller 2100 may drive firmware for controlling the memory device 2200. The memory controller 2100 may be configured the same as the memory controller 200 described with reference to FIG. 1.

In an embodiment, the memory controller 2100 may include components such as a random access memory (RAM), a processor, a host interface, a memory interface, and an ECC circuit.

The memory controller 2100 may communicate with an external device through the connector 2300. The memory controller 2100 may communicate with the external device (e.g., the host) according to a specific communication protocol. In an embodiment, the memory controller 2100 may communicate with the external device through at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and/or NVMe.

In an embodiment, the memory device 2200 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Transfer Torque magnetic RAM (STT-MRAM).

The memory controller 2100 and the memory device 2200 may be integrated into a single semiconductor device to constitute a memory card, such as a PC card (Personal Computer Memory Card International Association (PCMCIA)), a Compact Flash (CF) card, a Smart Media Card (e.g., SM and SMC), a memory stick, a Multi-Media Card (e.g., MMC, RS-MMC, MMCmicro and eMMC), a secure digital (SD) card (e.g., SD, miniSD, microSD and SDHC), and/or a Universal Flash Storage (UFS).

FIG. 12 is a block diagram illustrating a solid state drive (SSD) system 3000 to which the storage device is applied in accordance with an embodiment of the present disclosure.

Referring to FIG. 12, the SSD system 3000 includes a host 3100 and an SSD 3200. The SSD 3200 exchanges a signal SIG with the host 3100 through a signal connector 3001, and receives power PWR through a power connector 3002. The SSD 3200 includes an SSD controller 3210, a plurality of nonvolatile memories 3221 to 322n, an auxiliary power supply 3230, and a buffer memory 3240.

In an embodiment, the SSD controller 3210 may serve as the memory controller 200 described with reference to FIG. 1.

The SSD controller 3210 may control the plurality of nonvolatile memories 3221 to 322n in response to a signal SIG received from the host 3100. In embodiment, the signal SIG may be a signal based on an interface between the host 3100 and the SSD 3200. For example, the signal SIG may be defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and/or an NVMe.

The auxiliary power supply 3230 is coupled to the host 3100 through the power connector 3002. When the supply of power from the host 3100 is not smooth, the auxiliary power supply 3230 may provide power of the SSD 3200. In an embodiment, the auxiliary power supply 3230 may be located in the SSD 3200, or be located externally thereto. For example, the auxiliary power supply 3230 may be located on a main board, and provide auxiliary power to the SSD 3200.

The buffer memory 3240 operates as a buffer memory of the SSD 3200. For example, the buffer memory 3240 may temporarily store data received from the host 3100 or data received from the plurality of nonvolatile memories 3221 to 322n, or temporarily store meta data (e.g., a mapping table) of the flash memories 3221 to 322n. The buffer memory 3240 may include any of various volatile memories such as a DRAM, an SDRAM, a DDR SDRAM, an LPDDR SDRAM, and a GRAM or nonvolatile memories such as a FRAM, a ReRAM, an STT-MRAM, and/or a PRAM.

FIG. 13 is a block diagram illustrating a user system 4000 to which the storage device is applied in accordance with an embodiment of the present disclosure.

Referring to FIG. 13, the user system 4000 includes an application processor 4100, a memory module 4200, a network module 4300, a storage module 4400, and a user interface 4500.

The application processor 4100 may drive components included in the user system 4000, an operating system (OS), a user program, or the like. In an embodiment, the application processor 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include any of various volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and/or a FRAM. In an embodiment, the application processor 4100 and the memory module 4200 may be provided as one semiconductor package by being packaged based on a Package on Package (PoP).

The network module 4300 may communicate with external devices. In an embodiment, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. In an embodiment, the network module 4300 may be included in the application processor 4100.

The storage module 4400 may store data. For example, the storage module 4400 may store data received from the application processor 4100. Alternatively, the storage module 4400 may transmit data stored therein to the application processor 4100. In an embodiment, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. In an embodiment, the storage module 4400 may be provided as a removable drive such as a memory card of the user system 4000 or an external drive.

In an embodiment, the storage module 4400 may include a plurality of nonvolatile memory devices, each of which may operate the same as the memory device 100 described with reference to FIG. 1. The storage module 4400 may operate the same as the storage device 50 described with reference to FIG. 1.

The user interface 4500 may include interfaces for inputting data or commands to the application processor 4100 or outputting data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor and/or a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and/or a monitor.

In accordance with embodiments of the present disclosure, a memory controller having improved map update performance and an operating method thereof are provided.

While the present disclosure has been shown and described with reference to certain embodiments thereof, it will be understood by those skilled in the art that various changes in form and details may be made therein without departing from the spirit and scope of the present invention as defined by the appended claims and their equivalents. Therefore, the scope of the present invention should not be limited to the above-described embodiments but should be determined by the appended claims including equivalents thereof.

In the above-described embodiments, not all steps or portions thereof need necessarily be performed. In some cases, one or more steps or portions thereof may be omitted. Moreover, the steps need not necessarily be performed in the stated order; alternate orders may be possible. More generally, the disclosed embodiments are only examples to facilitate an understanding of the present invention, not to limit it. That is, it should be apparent to those skilled in the art that various modifications can be made on the basis of the technological scope of the present disclosure.

Also, although specific terminologies are used here, those are only to explain the embodiments of the present disclosure. Therefore, the present invention is not restricted to or by any such terminology. The present invention encompasses all variations that fall within the scope of the claims.

What is claimed is:

1. A memory controller for controlling a memory device which stores logical-to-physical (L2P) segments, the memory controller comprising:
   a map data storage configured to store a plurality of physical-to-logical (P2L) segments, each including mapping information between a physical address of the memory device in which write data is to be stored and a logical address received from a host, in response to a request received from the host; and
   a map manager configured to set each of the plurality of P2L segments as a data segment or an unmap segment according to a corresponding request, and update the L2P segments stored in the memory device, based on target P2L segments that are P2L segments set as the data segment among the plurality of P2L segments,
   wherein each of the L2P segments includes mapping information between a logical address and a physical address of data stored in the memory device,
   wherein the map data storage includes a first map storage configured to include a plurality of entry areas having a circular structure, and sequentially store the plurality of P2L segments according to indices of the plurality of entry areas in an input order, and
   wherein the map manager deletes the target P2L segments and unmap P2L segments corresponding to the target P2L segments from the first map storage and rearranges indices of target entry areas in which remaining P2L segments are stored by increasing a ranking of the indices of the target entry areas.

2. The memory controller of claim 1, wherein the map data storage includes:
   the first map storage; and
   a second map storage configured to load L2P segments to be updated based on the target P2L segments among the L2P segments stored in the memory device.

3. The memory controller of claim 2, wherein the map manager modifies the L2P segments loaded to the second map storage based on the target P2L segments stored in the first map storage.

4. The memory controller of claim 3, wherein the map manager flushes the modified L2P segments to the memory device.

5. The memory controller of claim 4, wherein the L2P segments flushed to the memory device are used to update the L2P segments stored in the memory device.

6. The memory controller of claim 3, wherein, when a number of the target P2L segments stored in the first map storage is greater than or equal to a reference value, the map manager modifies the L2P segments loaded to the second map storage based on the target P2L segments, and flushes the modified L2P segments to the memory device.

7. The memory controller of claim 2, wherein the first map storage stores flag information corresponding to each of the plurality of P2L segments, and
   wherein the flag information represents whether a corresponding P2L segment is the data segment or the unmap segment.

8. The memory controller of claim 7, wherein the map manager sets, as the data segment, flag information of P2L segments corresponding to a write request among the plurality of P2L segments, in response to the write request.

9. The memory controller of claim 7, wherein the map manager sets, as the unmap segment, flag information of P2L segments corresponding to an unmap request received from the host among the plurality of P2L segments, in response to the unmap request.

10. The memory controller of claim 7, wherein the map manager modifies the L2P segments loaded to the second map storage based on the target P2L segments stored in the first map storage and the unmap P2L segments corresponding to the target P2L segments.

11. The memory controller of claim 10, wherein the unmap P2L segments include the same logical address as the target P2L segments among the plurality of P2L segments, and flag information corresponds to P2L segments set as the unmap segment.

12. The memory controller of claim 10, wherein the map manager, after the L2P segments loaded to the second map storage are modified, rearranges the indices of the target entry areas by increasing the ranking of the indices of the target entry areas by a number of the deleted target P2L segments and the deleted unmap P2L segments.

13. A method for operating a memory controller for controlling a memory device which stores logical-to-physical (L2P) segments, the method comprising:
    storing sequentially a plurality of physical-to-logical (P2L) segments in a plurality of entry areas having a circular structure according to indices of the plurality of entry areas, the plurality of P2L segments each including mapping information between a physical address of the memory device in which write data is to be stored and a logical address from a host, in response to a request received from the host;
    setting each of the plurality of P2L segments as a data segment or an unmap segment according to a corresponding request;
    updating the L2P segments stored in the memory device, based on target P2L segments that are P2L segments set as the data segment among the plurality of P2L segments;
    deleting the target P2L segments and unmap P2L segments including the same logical address as the target P2L segments from the plurality of entry areas; and
    rearranging indices of target entry areas in which remaining P2L segments, except the deleted target P2L segments and the deleted unmap P2L segments, are stored by increasing a ranking of the indices of the target entry areas,
    wherein each of the L2P segments includes mapping information between a logical address and a physical address of data stored in the memory device.

14. The method of claim 13, wherein the storing of the plurality of P2L segments comprises storing flag information corresponding to each of the plurality of P2L segments, and
    wherein the flag information represents whether a corresponding P2L segment is the data segment or the unmap segment.

15. The method of claim 14, wherein the flag information is set as the data segment according to a write request, or is set as the unmap segment according to an unmap request received from the host.

16. The method of claim 14, wherein the updating of the L2P segments includes:

loading L2P segments to be updated among the L2P segments from the memory device based on the target P2L segments;

modifying the loaded L2P segments based on the target P2L segments; and flushing the modified L2P segments to the memory device.

17. The method of claim 16, wherein the modifying of the loaded L2P segments includes modifying the loaded L2P segments based on the target P2L segments and the unmap P2L segments.

18. The method of claim 17, wherein the ranking of the indices of the target entry areas is increased by a number of the deleted target P2L segments and the deleted unmap P2L segments.

* * * * *